United States Patent
Lear et al.

(10) Patent No.: US 9,403,524 B2
(45) Date of Patent: Aug. 2, 2016

(54) METHODS AND SYSTEM FOR STARTING A HYBRID VEHICLE

(71) Applicant: Ford Global Technologies, LLC, Dearborn, MI (US)

(72) Inventors: Christopher Alan Lear, Dearborn, MI (US); Mark Steven Yamazaki, Canton, MI (US); Larry Wroza, Brownstown, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/479,021

(22) Filed: Sep. 5, 2014

(65) Prior Publication Data

US 2016/0068152 A1 Mar. 10, 2016

(51) Int. Cl.

| B60W 10/06 | (2006.01) |
|---|---|
| B60W 10/08 | (2006.01) |
| B60W 10/10 | (2012.01) |
| B60W 20/00 | (2016.01) |
| B60W 30/194 | (2012.01) |
| F01N 3/20 | (2006.01) |

(52) U.S. Cl.
CPC ............... *B60W 10/06* (2013.01); *B60W 10/08* (2013.01); *B60W 10/10* (2013.01); *B60W 20/1082* (2013.01); *B60W 20/30* (2013.01); *B60W 30/194* (2013.01); *F01N 3/2006* (2013.01); *B60W 2530/12* (2013.01); *B60W 2710/0605* (2013.01); *B60W 2710/0627* (2013.01); *B60W 2710/0633* (2013.01); *B60W 2710/0694* (2013.01); *B60W 2710/081* (2013.01); *B60W 2710/1005* (2013.01); *Y10S 903/93* (2013.01)

(58) Field of Classification Search
CPC .............................. B60W 10/06; B60W 10/08
See application file for complete search history.

(56) References Cited

U.S. PATENT DOCUMENTS

| 5,415,139 | A | * | 5/1995 | Aoto | B60K 6/485 123/192.1 |
|---|---|---|---|---|---|
| 6,318,077 | B1 | * | 11/2001 | Claypole | F01N 3/2006 60/300 |
| 7,055,312 | B2 | * | 6/2006 | Osawa | B60W 10/06 180/65.235 |
| 8,655,573 | B2 | * | 2/2014 | Hokuto | F02D 41/005 123/399 |
| 2009/0025371 | A1 | * | 1/2009 | Hermansson | B60K 6/445 60/286 |
| 2012/0225752 | A1 | * | 9/2012 | Gonze | F01N 3/2026 477/100 |
| 2013/0146024 | A1 | | 6/2013 | Cunningham et al. | |
| 2013/0311021 | A1 | * | 11/2013 | Mitsutani | B60W 20/00 701/22 |
| 2013/0338864 | A1 | * | 12/2013 | Shallvari | B60W 10/06 701/22 |
| 2014/0297088 | A1 | * | 10/2014 | Ando | B60K 6/445 701/22 |

* cited by examiner

*Primary Examiner* — Tisha Lewis
(74) *Attorney, Agent, or Firm* — Julia Voutyras; Alleman Hall McCoy Russell & Tuttle LLP

(57) ABSTRACT

Systems and methods for improving emissions and drivability of a hybrid vehicle that includes a motor/generator and an engine are presented. The systems and methods may allow vehicle emissions regulations to be met while at the same time providing driveline torque that matches driver demand torque so that vehicle drivability may be maintained or improved.

20 Claims, 4 Drawing Sheets

US 9,403,524 B2

METHODS AND SYSTEM FOR STARTING A HYBRID VEHICLE

FIELD

The present description relates to methods and a system for starting an engine of a hybrid vehicle. The methods may be particularly useful for hybrid vehicles that include a driveline integrated starter/generator.

BACKGROUND AND SUMMARY

Hybrid vehicles may be required to meet emissions regulations for hydrocarbons, carbon monoxide, and oxides of nitrogen. One way to meet emissions regulations is to couple a three-way catalyst to an engine of the hybrid vehicle so that engine emissions are oxidized and reduced to more desirable gases. However, even with a three-way catalyst, a hybrid vehicle may not meet emissions regulations because the three-way catalyst may have to reach a light-off temperature (e.g., a temperature where catalyst efficiency reaches a threshold efficiency) before engine exhaust gases may be processed. One way to shorten an amount of time a catalyst takes to reach light-off temperature is to retard engine spark timing away from minimum spark advance for best torque (MBT). By retarding spark timing, exhaust gases may transfer additional heat to the engine's exhaust system and its components. Nevertheless, retarding engine spark timing may be insufficient to heat a catalyst to a light off temperature soon enough to meet emissions regulations. Therefore, it would be desirable to provide a way to reach catalyst light off temperature sooner.

The inventors herein have recognized the above-mentioned disadvantages and have developed a method, comprising: operating an engine with a substantially constant air mass and spark timing in response to catalyst temperature less than a threshold; varying engine torque as engine speed varies while operating the engine with the substantially constant air mass; and providing driver demand torque via engine torque and motor torque while operating the engine with the substantially constant air mass.

By operating an engine with a substantially constant air mass flowing through the engine, substantially constant spark retard, and varying engine torque as engine speed varies, it may be possible to provide the technical result of quickly heating a catalyst while producing a desired driver demand torque. In particular, the engine air mass may be selected to provide a desired rate of thermal energy from the engine to a catalyst so that the catalyst lights off within a desired time even in the presence of varying vehicle speed and driver demand torque. A motor coupled to the engine may augment or lower engine torque to provide a driver demand torque at a torque converter impeller as engine speed changes during vehicle acceleration and deceleration. In this way, flow of air through an engine may be held substantially constant even as engine speed changes so that a catalyst lights off in a repeatable fashion as a vehicle accelerates or decelerates.

The present description may provide several advantages. In particular, the approach may improve vehicle emissions. Further, the approach may improve vehicle drivability during engine starting. Additionally, the approach may allow more accurate air-fuel ratio control while engine emissions components are being heated to operating temperature.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
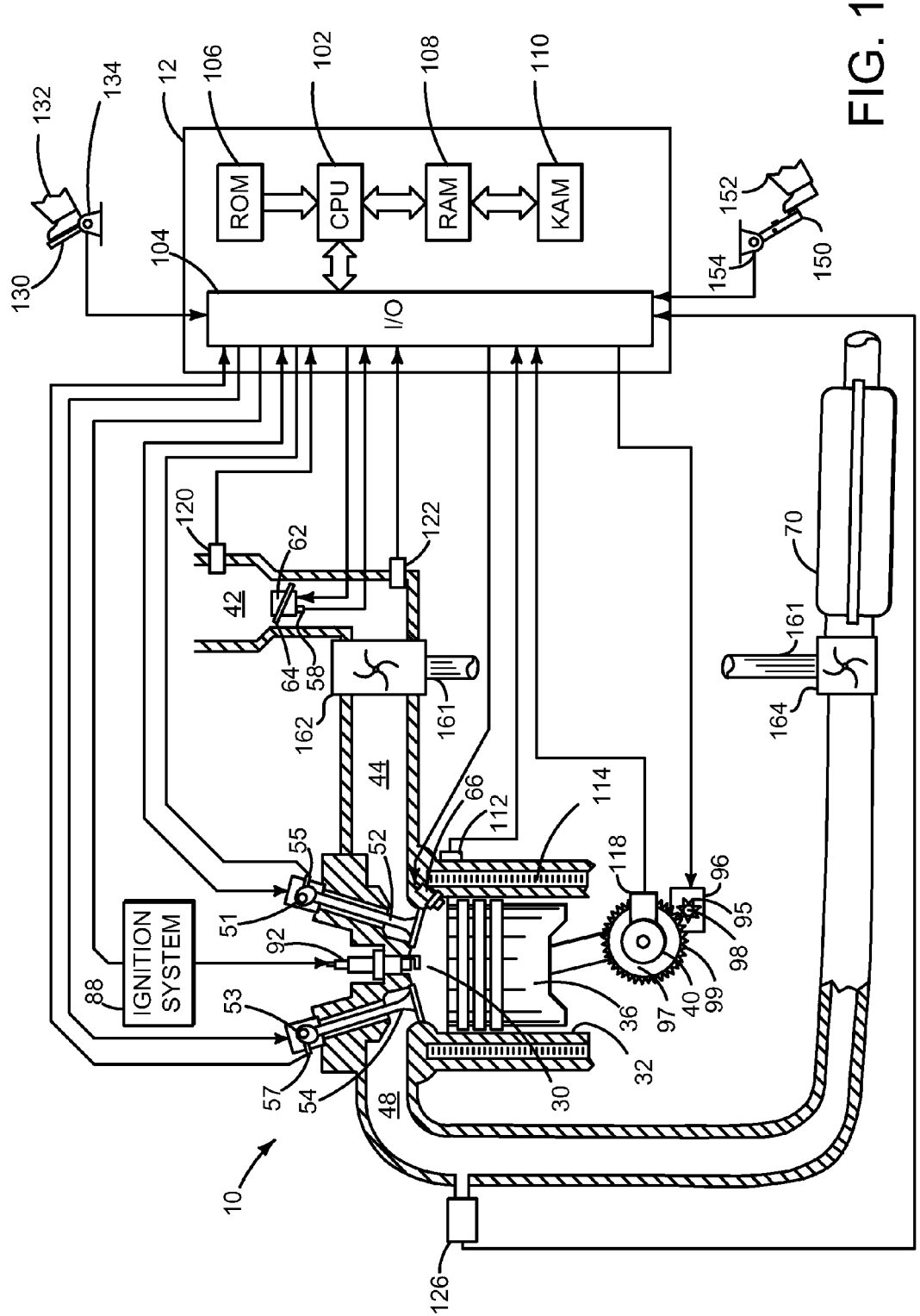
FIG. 1 is a schematic diagram of an engine.
Figure 2:
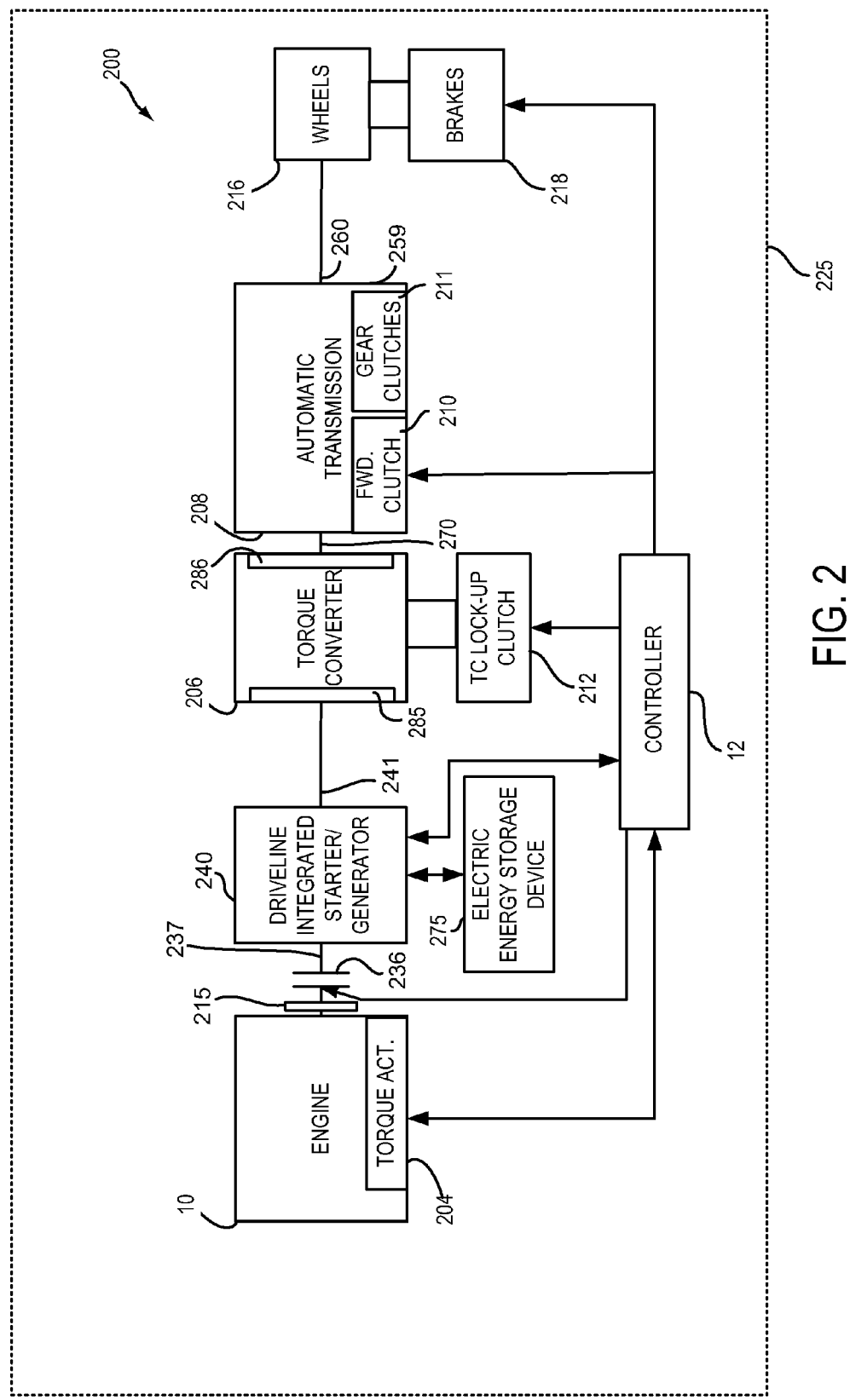
FIG. 2 shows an example vehicle driveline configuration.
Figure 3:
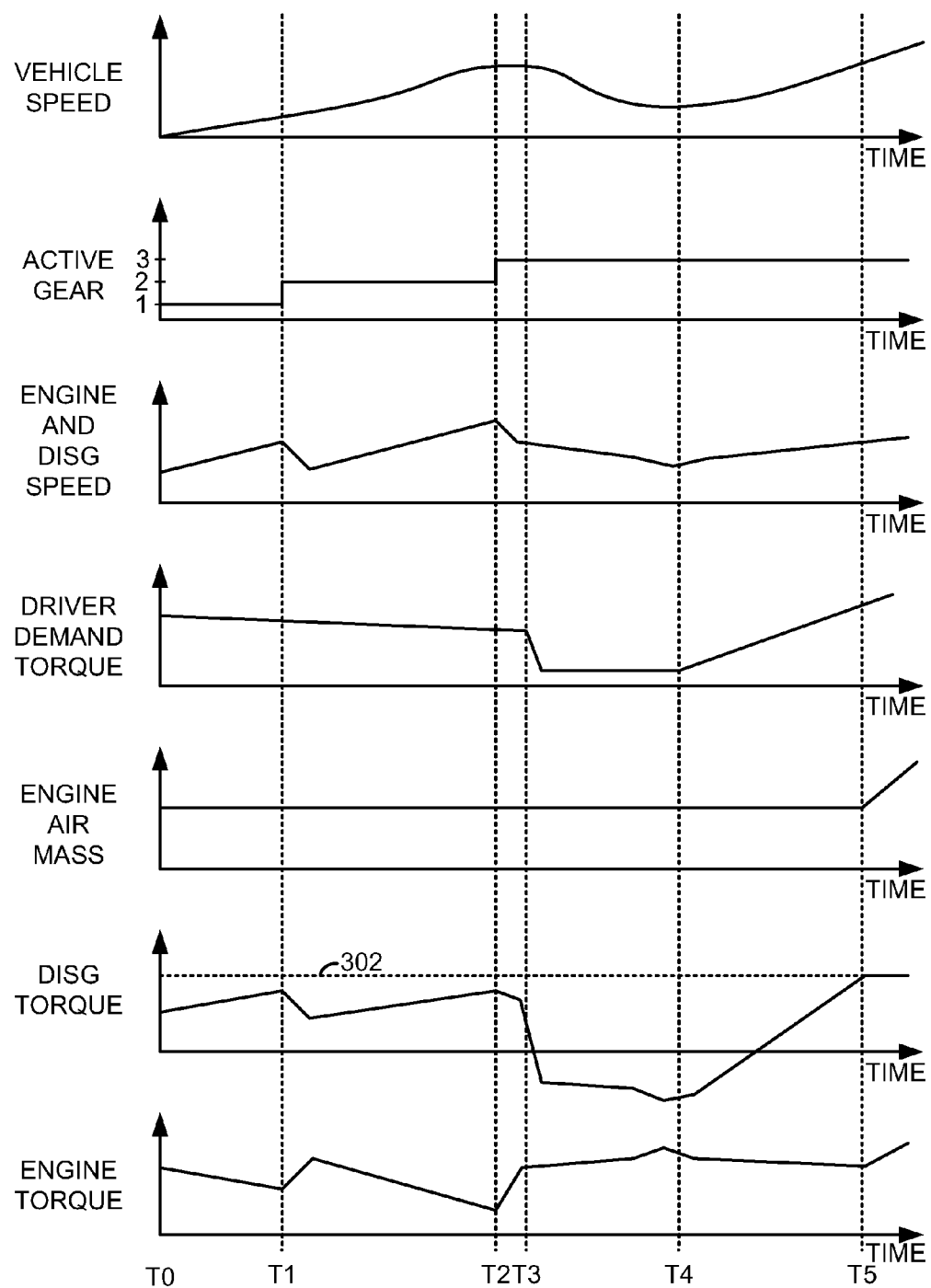
FIG. 3 shows an example hybrid vehicle operating sequence.

The present description is related to improving hybrid vehicle emissions after an engine is started. The hybrid vehicle may include an engine as is shown in FIG. 1. Further, the engine may be included in a driveline of the hybrid vehicle as is shown in FIG. 2. Engine emissions may be reduced via heating a catalyst by operating an engine and driveline integrated starter/generator (DISG) as shown in the sequence of FIG. 3. The engine and DISG may be operated according to the method of FIG. 4 in the system of FIGS. 1 and 2 to provide the operating sequence shown in FIG. 3.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width from controller 12. Fuel is delivered to fuel injector 66 by a fuel system (not shown) including a fuel tank, fuel pump, and fuel rail (not shown).

In addition, intake manifold 44 is shown communicating with turbocharger compressor 162. Shaft 161 mechanically couples turbocharger turbine 164 to turbocharger compressor 162. Optional electronic throttle 62 adjusts a position of throttle plate 64 to control air flow from air intake 42 to compressor 162 and intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a driveline 200. The driveline of FIG. 2 includes engine 10 shown in FIG. 1. Driveline 200 may be powered by engine 10. Engine 10 may be started with an engine starting system shown in FIG. 1 or via driveline integrated starter/generator (DISG) 240. DISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input side of driveline disconnect clutch 236 through dual mass flywheel 215. Disconnect clutch 236 may be electrically or hydraulically actuated. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 (e.g., high voltage battery or power source) may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211

(e.g., 1-10) and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by craning engine 10 and resuming cylinder combustion.

Referring now to FIG. 3, an example hybrid vehicle operating sequence is shown. The sequence of FIG. 3 may be provided by the system of FIGS. 1 and 2 executing the method of FIG. 4 stored as instructions in non-transitory memory. The vertical lines at T1-T5 represent particular time of interest during the sequence.

The first plot from the top of FIG. 3 is a plot of vehicle speed versus time. The Y axis represents vehicle speed and vehicle speed increases in the direction of the Y axis arrow. The X axis represents time and time increases from the left to right side of the figure.

The second plot from the top of FIG. 3 is a plot of active transmission gear versus time. The Y axis represents active transmission gear and the active transmission gears are indicated along the Y axis. The X axis represents time and time increases from the left to right side of the figure.

The third plot from the top of FIG. 3 is a plot of engine and DISG speed versus time. The Y axis represents engine and DISG speed and engine and DISG speed increases in the direction of the Y axis arrow. The X axis represents time and time increases from the left to right side of the figure. The engine and the DISG are coupled together during the sequence via the driveline disconnect clutch.

The fourth plot from the top of FIG. 3 is a plot of driver demand torque versus time. The Y axis represents driver demand torque and driver demand torque increases in the direction of the Y axis arrow. The X axis represents time and time increases from the left to right side of the figure.

The fifth plot from the top of FIG. 3 is a plot of engine air mass or mass of air flowing through the engine versus time. The Y axis represents engine air mass and engine air mass increases in the direction of the Y axis arrow. The X axis represents time and time increases from the left to right side of the figure.

The sixth plot from the top of FIG. 3 is a plot of DISG torque versus time. The Y axis represents DISG torque and DISG torque increases in the direction of the Y axis arrow. The X axis represents time and time increases from the left to right side of the figure. Horizontal line 302 represents a maximum DISG torque at DISG speeds below a DISG speed where the DISG changes from having a constant maximum torque output to having a constant maximum power output.

The seventh plot from the top of FIG. 3 is a plot of engine torque versus time. The Y axis represents engine torque and engine torque increases in the direction of the Y axis arrow. The X axis represents time and time increases from the left to right side of the figure.

At time T0, a driver inputs a driver demand torque after a cold engine start and vehicle speed begins to increase. The engine air mass or air flowing through the engine is at a predetermined constant level. The DISG torque begins to increase in response to the driver demand torque and the engine torque begins to decrease so that DISG torque plus engine torque meets the driver demand torque at a torque converter impeller that is downstream of the DISG. The engine speed increases since the DISG and engine are coupled and because the combined DISG and engine torque is increasing in response to the driver demand torque. The transmission is in first gear and the vehicle speed begins to increase in response to the driver demand torque.

At time T1, the transmission shifts into second gear. The transmission shifts in response to the driver demand torque and vehicle speed. The vehicle speed continues to increase and the engine speed and DISG speed decrease in response to shifting into a higher gear. The driver demand torque is slowly being reduced in response to a driver operating the accelerator pedal, and the engine air mass remains constant even though engine speed is reduced. Engine air mass may be held constant when engine speed is reduced by opening the engine's throttle and/or advancing intake valve timing. Opening the engine throttle and/or advancing intake valve timing increases engine torque. The DISG torque is reduced in response to the increase in engine torque.

Between time T1 and time T2, the engine's throttle is closed (not shown) to maintain constant engine air flow as engine speed and DISG speed increase. Closing the engine's throttle reduces intake manifold pressure so that engine cylinders produce less torque for each combustion event. Consequently, engine torque decreases in response to engine speed increasing and maintaining constant engine air flow.

At time T2, the transmission shifts from second gear to third gear in response to vehicle speed and driver demand torque. The engine and DISG speed are reduced in response to the transmission entering third gear. The engine air mass remains constant and the engine torque increases in response to the decrease in engine speed to maintain the constant engine air mass. The engine torque is increased via opening the engine's throttle or advancing intake valve opening timing. The DISG torque is reduced in response to increasing engine torque. The engine torque plus the DISG torque provides the desired driver demand torque at the vehicle's torque converter impeller.

At time T3, the vehicle speed has reached a higher level and the driver reduces the driver demand torque via partially releasing the accelerator pedal. The engine torque increases to maintain engine air flow and DISG torque is decreased in response to the decreased driver demand torque and the increased engine torque. The engine speed and DISG speed are reduced in response to the reduced driver demand torque. The transmission remains in third gear and the vehicle speed begins to decrease.

Between time T3 and time T4, the driver demand torque remains low and the engine speed and DISG speed decrease in response to the low driver demand torque. The engine torque increases a slight amount to maintain the engine air amount and the DISG torque decreases in response to the increase in engine torque. The vehicle speed continued to slow.

At time T4, the driver increases the driver demand torque via applying the accelerator pedal. The transmission remains in third gear and the engine and DISG speed begin to increase in response to the combined DISG torque and engine torque providing the driver demand torque. The engine torque decreases as the engine speed increases to maintain the constant engine air flow. The DISG torque increases with the increasing driver demand torque and decreasing engine torque.

At time T5, the DISG torque reaches torque limit 302. Torque limit 302 may be a maximum engine torque at the present DISG speed. The maximum DISG torque is a function of DISG speed. DISG torque is maintained at the maximum DISG torque and engine torque is increased so that the DISG torque plus engine torque provides the driver demand torque at the vehicle's torque converter impeller. The engine air flow is increased to increase engine torque after the DISG is at its maximum torque. Thus, if the DISG provides its maximum torque and additional torque is needed to meet driver demand torque, the engine air mass may be increased to meet the driver demand torque. In this way, the engine air flow may be held at a constant flow until driver demand torque exceeds maximum DISG torque plus engine torque when the engine is operated with the predetermined constant air mass.

Figure 4:
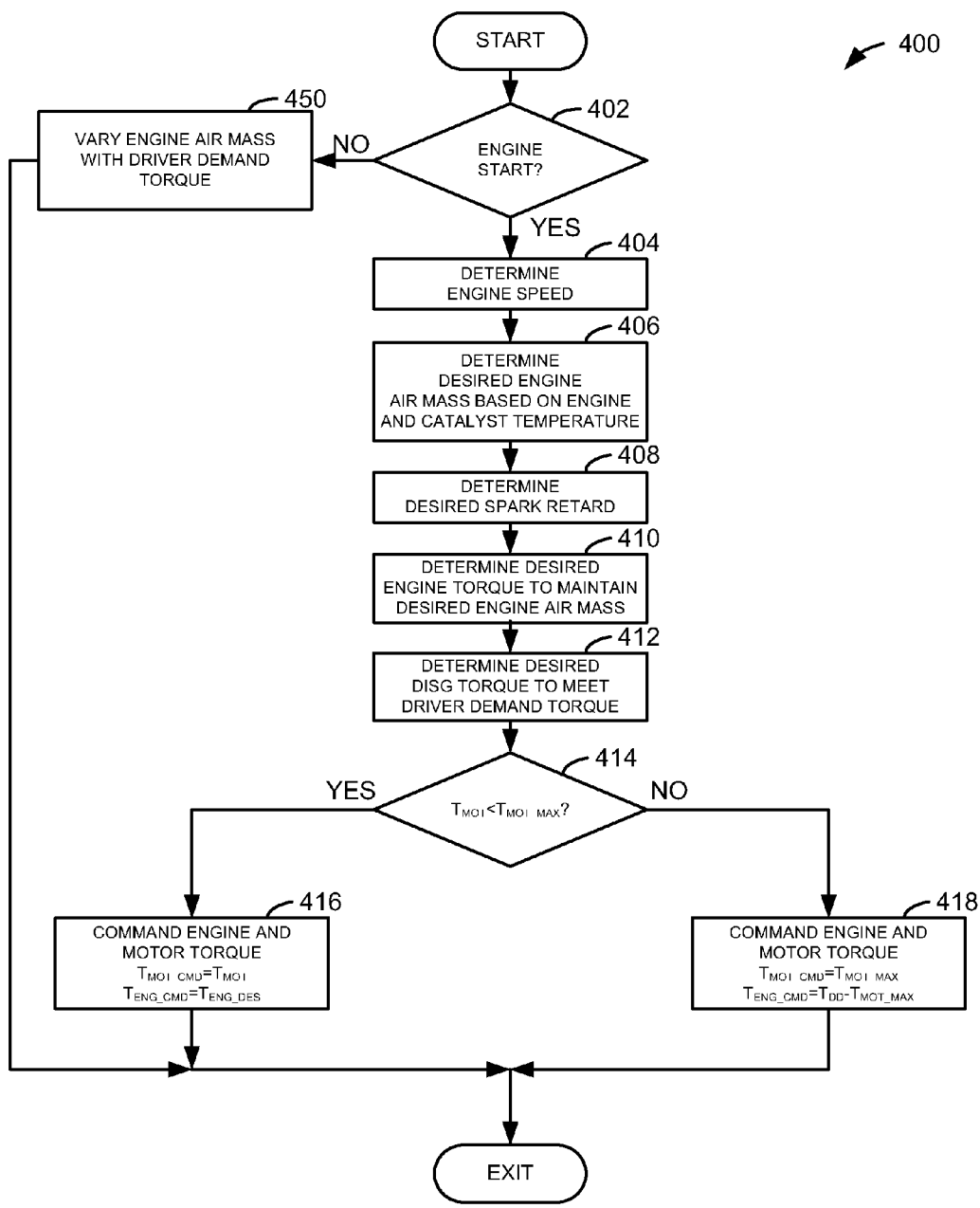
FIG. 4 shows an example method for operating a hybrid vehicle driveline.

Referring now to FIG. 4, a method for operating a hybrid vehicle driveline is shown. The method of FIG. 4 may be included in the system of FIGS. 1 and 2 as executable instructions stored in non-transitory memory. Additionally, the method of FIG. 4 may provide the operating sequence shown in FIG. 3.

At 402, method 400 judges if the engine is being cold started. Alternatively, or in addition, method 400 may judge if the engine is operating within predetermined conditions after a cold start, or if the engine is operating within predetermined conditions after a warm engine start. The predetermined conditions after cold and/or warm start may be that a catalyst temperature is less than a first threshold temperature and/or that engine temperature is less than a second threshold temperature. The engine may be considered to be cold started when engine and/or exhaust component temperature is less than a threshold temperature (e.g., 20° C.) and before the engine has been operating for a predetermined amount of time or before the engine has reached a threshold temperature. If method 400 judges that the engine is being cold started or if the engine is operating within predetermined conditions after a start, the answer is yes and method 400 proceeds to 404. Otherwise, the answer is no and method 400 proceeds to 450.

At 450, method 400 adjusts the engine air mass in response to the driver demand torque and spark is adjusted to knock limited or MBT spark timing. For example, if driver demand torque increases, the engine air amount increases. If driver demand torque decreases, the engine air amount decreases. Additionally, the engine air-fuel ratio averages a near stoichiometric air-fuel ratio. Method 400 proceeds to exit after engine air-fuel ratio is adjusted.

At 404, method 400 determines engine speed. In one example, engine speed is determined via measuring time between engine positions via an engine position sensor. Further, method 400 determines driver demand torque at 404. In one example, driver demand torque may be based on accelerator pedal position and vehicle speed. Specifically, vehicle speed and accelerator pedal position are used to index a table containing empirically determined driver demand torques. The table outputs the driver demand torque based on the accelerator pedal position and vehicle speed. Method 400 proceeds to 406 after engine speed is determined.

At 406, method 400 determines desired engine air mass or the desired amount of air to flow through the engine. In one example, the desire engine air mass is empirically determined and stored in a table or function that is indexed based on engine temperature and/or catalyst temperature. Additionally, the table or function may be indexed via time since engine stop. The table may contain desired engine air mass amounts that allow a catalyst in the engine exhaust system to reach a desired temperature within a threshold amount of time. The desired engine air mass may be a substantially constant value (e.g., varying less than 10%) from the time since engine speed reaches a threshold speed after engine stop until a catalyst reaches a desired temperature or until driver demand exceeds a threshold torque, including all time between. Further, in some examples, the substantially constant air mass may be based on engine temperature or catalyst temperature during engine starting. For example, the engine air mass may be a greater value for lower catalyst and engine temperatures, though the engine air mass remains constant from a time the engine reaches a threshold speed after engine stop until predetermined conditions are achieved (e.g., the catalyst or engine reach a threshold temperature). For example, if engine temperature is 20° C. during a first start, the engine air flow may be X Kg/sec. However, if engine temperature is 15° C. during a second start, the engine air flow may be Y Kg/sec, where Y is greater than X. The respective X and Y air masses may flow through the engine from the time since engine speed reaches a threshold speed after engine stop until a catalyst reaches a desired temperature or until driver demand exceeds a threshold torque. The desired engine air mass is output from the table and method 400 proceeds to 408.

At 408, method 400 determines a desired spark retard from minimum spark advance timing for best engine torque (MBT). In one example, the spark retard from MBT is empirically determined and stored in a table or function that may be indexed based on time since engine stop and/or engine or catalyst temperature. The table or function outputs a spark retard and method 400 proceeds to 410. In one example, the spark retard from MBT spark timing may be substantially constant (e.g., changing by less than 5 crankshaft angle degrees) from the time since engine stop until a catalyst reaches a desired temperature or until driver demand exceeds a threshold torque.

At 410, method 400 determines desired engine torque to provide the desire engine air mass determined at 406. In one example, the desired engine air flow determined at 406 is multiplied by a fuel to air ratio to determine a fuel flow rate. The fuel flow rate may be used to index a table or function that outputs engine torque based on fuel flow rate and engine speed. The table or function outputs empirically determined engine torque values corresponding to the engine torque produced at the present engine speed when engine fuel flow is based on the desired air flow and fuel to air ratio. Method 400 proceeds to 412 after the desired engine torque is determined.

At 412, method 400 determines the desired DISG or motor torque. In one example, the desired motor torque is determined via the following equation:

$$T_{MOT} = T_{DD} - T_{DES\_ENG}$$

where $T_{MOT}$ is the desired motor torque, $T_{DD}$ is the driver demand torque, and where $T_{DES\_ENG}$ is the desired engine torque determined at 410. Method 400 proceeds to 414 after desired motor torque is determined.

At 414, method 400 judges if motor torque (e.g., $T_{MOT}$) is less than maximum motor torque (e.g., $T_{MOT\_MAX}$). If so, the answer is yes and method 400 proceeds to 416. Otherwise, the answer is no and method 400 proceeds to 418.

At 416, method 400 determines the motor and engine torque commands. In particular, the motor torque command is $T_{MOT\_CMD} = T_{MOT}$, or the motor torque command is the motor torque determined at 412. The engine torque command is $T_{ENG\_CMD} = T_{DES\_ENG}$, or the engine torque command is the desired engine torque determined at 410. Method 400 proceeds to exit after the engine and motor commands are determined.

Additionally at 416, method 400 provides for operating the engine with a substantially constant air mass (e.g., air mass that changes by less than 10%) as a transmission shifts gears. Further, method 400 may upshift a transmission from a lower gear to a higher gear in response to speed of the motor being within a threshold speed of a speed where the motor transitions from providing a constant maximum torque to providing a constant maximum power. By upshifting the transmission, the maximum DISG torque may be held at a higher value than if the DISG speed were to continue increasing. Consequently, the engine may be held with a constant air mass flowing through engine even as the vehicle speed increases. Thus, method 400 may limit DISG speed to a speed less than a speed where the DISG transitions from providing a constant maximum torque to providing a constant maximum power to provide a greater maximum DISG torque.

During conditions where engine torque is greater than driver demand torque, the DISG may be transitioned from a motor mode (e.g., providing positive torque to the driveline) to a generator mode (e.g., providing negative torque to the driveline) while the engine operates at the substantially constant air mass.

At 418, method 400 determines the motor and engine torque commands. In particular, the motor torque command is $T_{MOT\_CMD} = T_{MOT\_MAX}$, or the motor torque command is the maximum motor torque at the present motor speed. The engine torque command is $T_{ENG\_CMD} = T_{DD} - T_{MOT\_MAX}$, or the engine torque command is the driver demand torque determined at 404 minus the maximum motor torque at the present motor speed. The engine torque is adjusted via adjusting throttle position, intake valve closing timing, and/or fuel injection. Motor torque is adjusted by adjusting an amount of current supplied to the motor. Further, if the motor torque command is negative, the motor is operated as a generator to absorb engine torque. Thus, at 418 the engine torque command increases with driver demand torque such that the engine air flow increases from the substantially constant air amount in response to driver demand torque being greater than maximum engine torque while the engine operates with the substantially constant air amount and maximum DISG torque at a present DISG speed. Method 400 proceeds to exit after the engine and motor commands are determined.

The engine torque may be adjusted via adjusting the amount of fuel injected and the engine throttle position or intake valve closing timing. In one example, as desired engine torque is adjusted to provide the desired engine air mass as engine speed changes, the throttle or intake valve timing may be adjusted to provide a desired intake manifold pressure that corresponds to the desired engine air-flow rate at the present engine speed. In particular, engine intake manifold pressure may be adjusted to provide the desired engine air mass via adjusting the engine throttle or intake valve closing time based on the following speed/density equation:

$$P = \frac{R \cdot T \cdot Me \cdot 2}{\eta_v \cdot N_e}$$

where Me is the desired engine air flow, R is a gas constant, T is air temperature, $N_e$ is engine speed, P is manifold pressure, and $\eta_v$ is engine volumetric efficiency. The intake manifold pressure may be closed loop control based on intake manifold pressure. For example, if intake manifold pressure is greater than desired based on intake manifold pressure feedback from a pressure sensor, the throttle may be closed further.

Thus, the method of FIG. 4 provides for a method, comprising: operating an engine with a substantially constant air mass and spark timing in response to catalyst temperature less than a threshold; varying engine torque as engine speed varies while operating the engine at the substantially constant air mass; and providing driver demand torque via engine torque and motor torque while operating the engine at the substantially constant air mass. The method includes where the spark timing is retarded from minimum spark timing for best engine torque. The method includes where engine torque is adjusted via adjusting a position of a throttle.

In some examples, the method includes where engine torque is further adjusted via adjusting an amount of fuel injected to the engine. The method also includes where engine torque is adjusted via adjusting a position of an intake cam or timing of an intake valve. The method includes where the engine is operated with the substantially constant air mass as a transmission shifts gears. The method also includes where the substantially constant air mass is varied in response to engine or catalyst temperature during engine starting. The method further comprises upshifting a transmission gear in response to speed of the motor being within a threshold speed of a speed where the motor transitions from providing a constant maximum torque to providing a constant maximum power.

The method of FIG. 4 also provides for: varying engine torque as engine speed varies while operating an engine at a substantially constant air mass in response to a temperature being less than a threshold and driver demand torque being less than a maximum engine torque plus a maximum driveline integrated starter/generator (DISG) torque, where the maximum engine torque is produced while the engine operates at the substantially constant air mass, and where the maximum (DISG) torque is at a present DISG speed; and providing driver demand torque via engine torque and DISG torque while operating the engine at the substantially constant air mass. In some examples, the method includes where the engine is operated with a substantially constant spark timing when the engine is operated with the substantially constant air mass. The method also includes where the temperature is a catalyst temperature or an engine temperature. The method further comprises increasing engine air amount from the substantially constant air amount in response to driver demand torque being greater than maximum engine torque while the engine operates with the substantially constant air amount and maximum DISG torque at a present DISG speed. The method further comprises upshifting a transmission gear in response to speed of the DISG being within a threshold speed of a speed where the DISG transitions from a constant maximum torque to a constant maximum power. The method includes where the substantially constant air mass is adjusted in response to a temperature at engine start. The method further comprises limiting DISG speed to a speed less than a speed where the DISG transitions from providing a constant maximum torque to providing a constant maximum power.

In some examples, the method of FIG. 4 provides for a method, comprising: varying engine torque as engine speed varies while operating the engine at a substantially constant air mass; transitioning a driveline integrated starter/generator (DISG) from a motor mode to a generator mode in response engine torque exceeding driver demand torque while the engine operates at the substantially constant air mass; and providing driver demand torque via engine torque and motor torque while operating the engine at the substantially constant air mass. The method further comprises increasing engine air amount from the substantially constant air amount in response to driver demand torque being greater than maximum engine torque while the engine operates with the substantially constant air amount and maximum DISG torque at a present DISG speed. The method further comprises upshifting a transmission gear in response to speed of the DISG being within a threshold speed of a speed where the DISG transitions from a constant maximum torque to a constant maximum power. The method further comprises limiting DISG speed to a speed less than a speed where the DISG transitions from providing a constant maximum torque to providing a constant maximum power. The method includes where the engine is operated with a substantially constant spark timing when the engine is operated with the substantially constant air mass.

As will be appreciated by one of ordinary skill in the art, the methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, 13, 14, 15, V6, V8, V10, and V12 engines operating in natural gas, gasoline, diesel, or alternative fuel configurations could use the present description to advantage.

The invention claimed is:

1. A method, comprising:
    operating an engine with a substantially constant air mass and spark timing in response to catalyst temperature less than a threshold;
    varying engine torque as engine speed varies while operating the engine at the substantially constant air mass; and
    providing driver demand torque via engine torque and motor torque while operating the engine at the substantially constant air mass.

2. The method of claim 1, where the spark timing is retarded from minimum spark timing for best engine torque.

3. The method of claim 1, where engine torque is adjusted via adjusting a position of a throttle.

4. The method of claim 3, where engine torque is further adjusted via adjusting an amount of fuel injected to the engine.

5. The method of claim 2, where engine torque is adjusted via adjusting a position of an intake cam or timing of an intake valve.

6. The method of claim 1, where the engine is operated with the substantially constant air mass as a transmission shifts gears.

7. The method of claim 1, where the substantially constant air mass is based on engine or catalyst temperature during engine starting.

8. The method of claim 1, further comprising upshifting a transmission gear in response to speed of a motor being within a threshold speed of a speed where the motor transitions from providing a constant maximum torque to providing a constant maximum power.

9. A method, comprising:
    varying engine torque as engine speed varies while operating an engine at a substantially constant air mass in response to a temperature being less than a threshold and driver demand torque being less than a maximum engine torque plus a maximum driveline integrated starter/generator (DISG) torque, where the maximum engine torque is produced while the engine operates at the substantially constant air mass, and where the maximum DISG torque is at a present DISG speed; and
    providing driver demand torque via engine torque and DISG torque while operating the engine at the substantially constant air mass.

10. The method of claim 9, where the engine is operated with a substantially constant spark timing when the engine is operated with the substantially constant air mass.

11. The method of claim 9, where the temperature is a catalyst temperature or an engine temperature.

12. The method of claim 9, further comprising increasing engine air amount from the substantially constant air mass in response to driver demand torque being greater than maximum engine torque while the engine operates with the substantially constant air mass and maximum DISG torque at the present DISG speed.

13. The method of claim 9, further comprising upshifting a transmission gear in response to speed of a DISG being within a threshold speed of a speed where the DISG transitions from a constant maximum torque to a constant maximum power.

14. The method of claim 9, where the substantially constant air mass is based on a temperature at engine start.

15. The method of claim 9, further comprising limiting DISG speed to a speed less than a speed where a DISG transitions from providing a constant maximum torque to providing a constant maximum power.

16. A method, comprising:
varying engine torque as engine speed varies while operating an engine at a substantially constant air mass;
transitioning a driveline integrated starter/generator (DISG) from a motor mode to a generator mode in response to engine torque exceeding driver demand torque while the engine operates at the substantially constant air mass; and
providing driver demand torque via engine torque and motor torque while operating the engine at the substantially constant air mass.

17. The method of claim 16, further comprising increasing engine air amount from the substantially constant air mass in response to driver demand torque being greater than maximum engine torque while the engine operates with the substantially constant air mass and maximum DISG torque at a present DISG speed.

18. The method of claim 16, further comprising upshifting a transmission gear in response to speed of the DISG being within a threshold speed of a speed where the DISG transitions from a constant maximum torque to a constant maximum power.

19. The method of claim 16, further comprising limiting DISG speed to a speed less than a speed where the DISG transitions from providing a constant maximum torque to providing a constant maximum power.

20. The method of claim 16, where the engine is operated with a substantially constant spark timing when the engine is operated with the substantially constant air mass.

* * * * *